Figure 1:
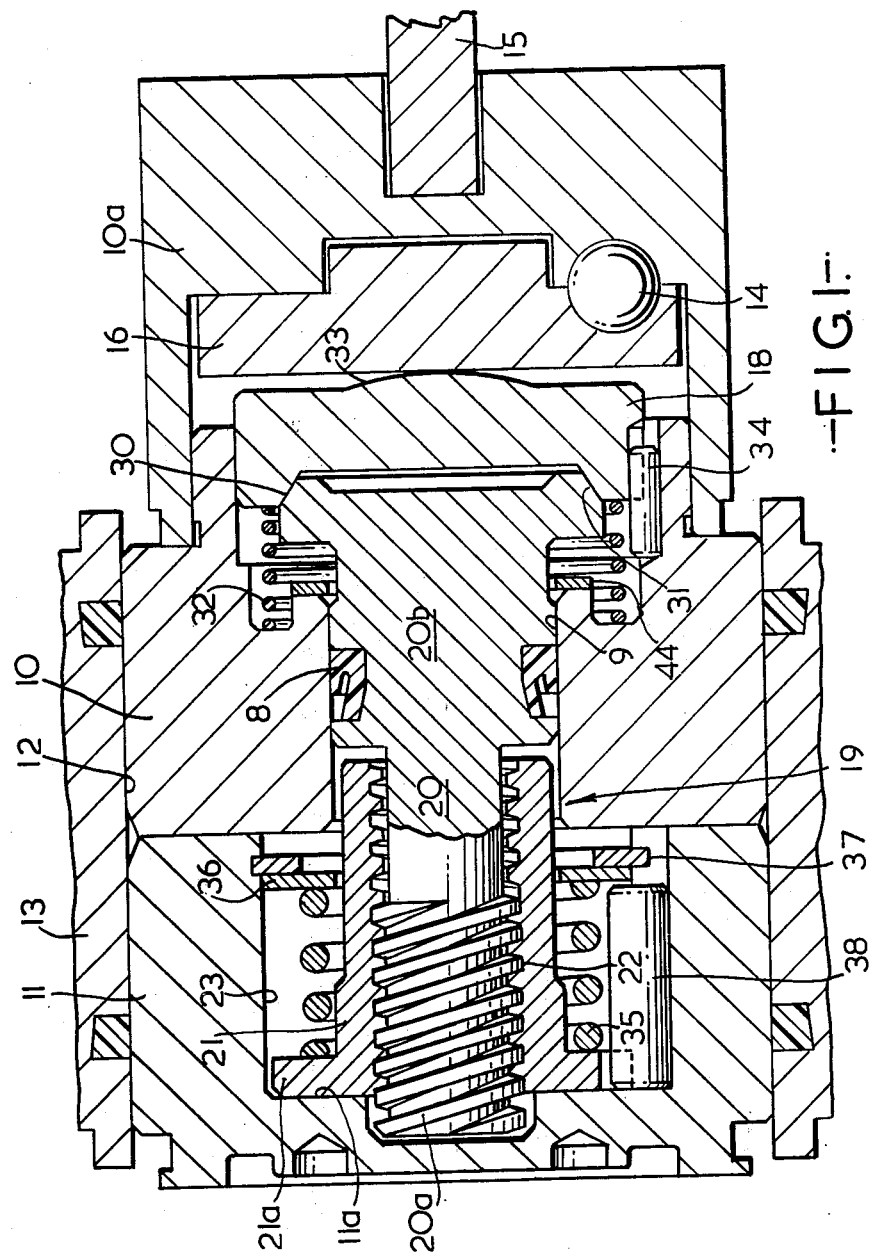

United States Patent [19]

Farr

[11] 4,056,173

[45] Nov. 1, 1977

[54] AUTOMATIC SLACK ADJUSTER FOR VEHICLE BRAKES COMBINED WITH A HYDRAULIC ACTUATOR AND AUXILIARY MECHANICAL ACTUATOR ASSEMBLY

[75] Inventor: Glyn Phillip Reginald Farr, Leek Wootton, England

[73] Assignee: Girling Limited, Birmingham, England

[21] Appl. No.: 673,858

[22] Filed: Apr. 5, 1976

[30] Foreign Application Priority Data

Apr. 8, 1975 United Kingdom ............... 14269/75

[51] Int. Cl.² ............................................. F16D 65/56
[52] U.S. Cl. .............................. 188/71.9; 188/72.6; 188/196 D
[58] Field of Search ............... 188/71.9, 71.8, 72.6, 188/72.7, 367, 196 D, 196 V, 196 A, 106 F, 79.5 GE; 192/111 A

[56] References Cited

U.S. PATENT DOCUMENTS

| | | | |
|---|---|---|---|
| 3,488,687 | 1/1970 | Farr | 188/71.9 |
| 3,633,712 | 1/1972 | Farr | 188/71.9 |
| 3,701,400 | 10/1972 | Burnett et al. | 188/72.6 |
| 3,765,513 | 10/1973 | Brooks | 188/106 F X |
| 3,774,733 | 11/1973 | Farr | 188/71.9 X |
| 3,800,920 | 4/1974 | Warwick | 188/106 F |

Primary Examiner—Trygve M. Blix
Assistant Examiner—Douglas C. Butler

Attorney, Agent, or Firm—Scrivener, Parker, Scrivener & Clarke

[57] ABSTRACT

A hydraulic actuator for a vehicle brake system is provided with an auxiliary mechanical actuator e.g. a handbrake cam which is fitted to a first component (e.g. a first piston) of the hydraulic actuator and acts through an automatic slack adjuster on a second component (e.g. a second piston) of the hydraulic actuator. The adjuster comprises a rotatable push rod and a non-rotatable nut with a screw-thread connection therebetween. The rotatable push rod has a portion which is sealed to the first piston and upon which the mechanical actuator acts. A relatively light spring biases at least the above mentioned portion of the rotatable push rod away from the mechanical actuator and automatic adjustment comprising rotation of the rotatable push rod is effected when there is at least a tendency for the above mentioned push rod portion to be displaced and the applied hydraulic pressure is at a relatively low value at which the force applied by the hydraulic pressure to the the above mentioned push rod portion is less than the force of the spring. When the applied hydraulic pressure is above this predetermined relatively low value there is no tendency for the rotatable push rod to move away from the mechanical actuator and no adjustment can take place. The adjuster is thereby rendered load insensitive, i.e. it will not overadjust in the event of brake deflection on heavy brake application.

30 Claims, 8 Drawing Figures

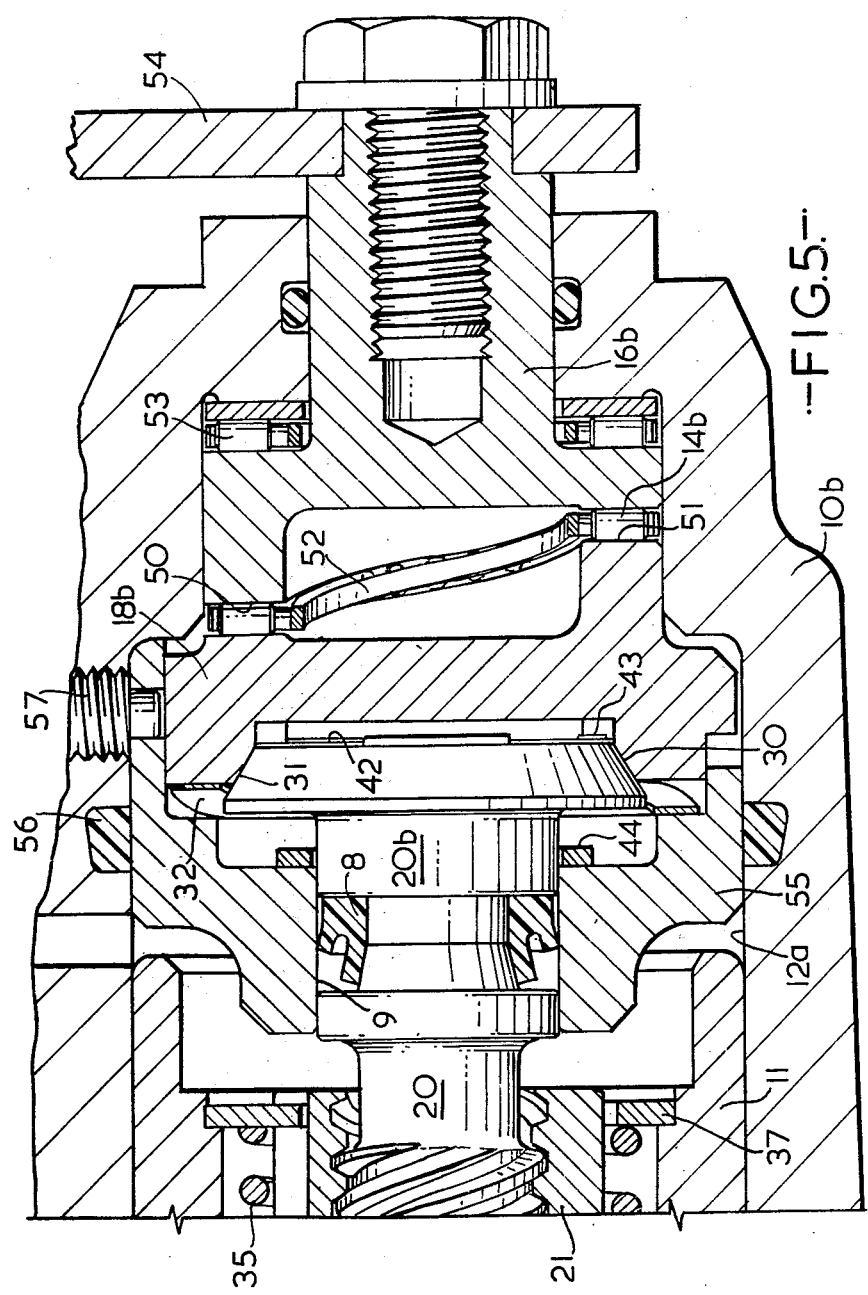

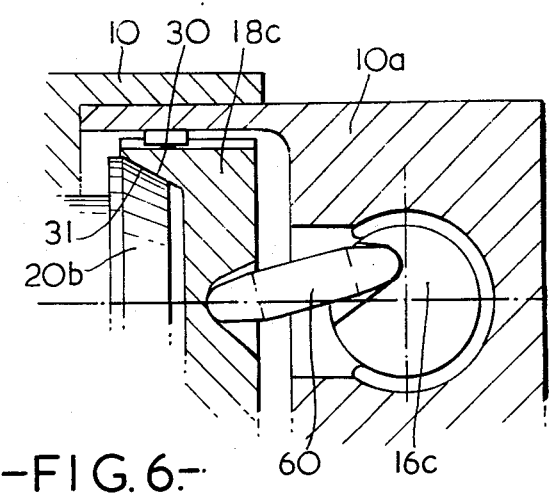
-FIG. 6.-
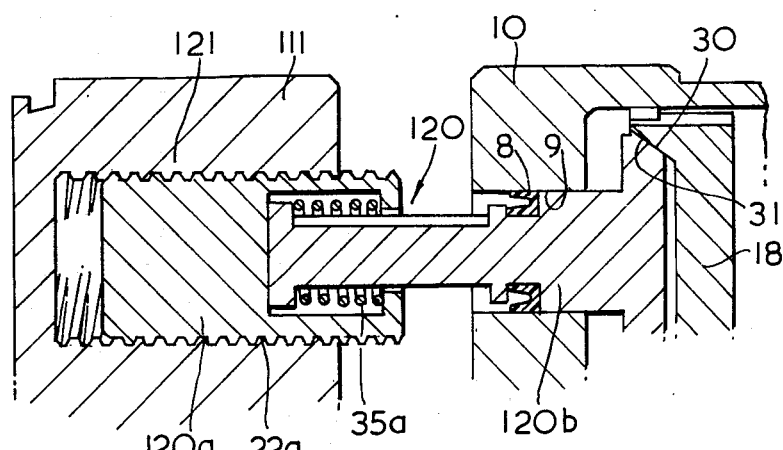
-FIG. 7.-

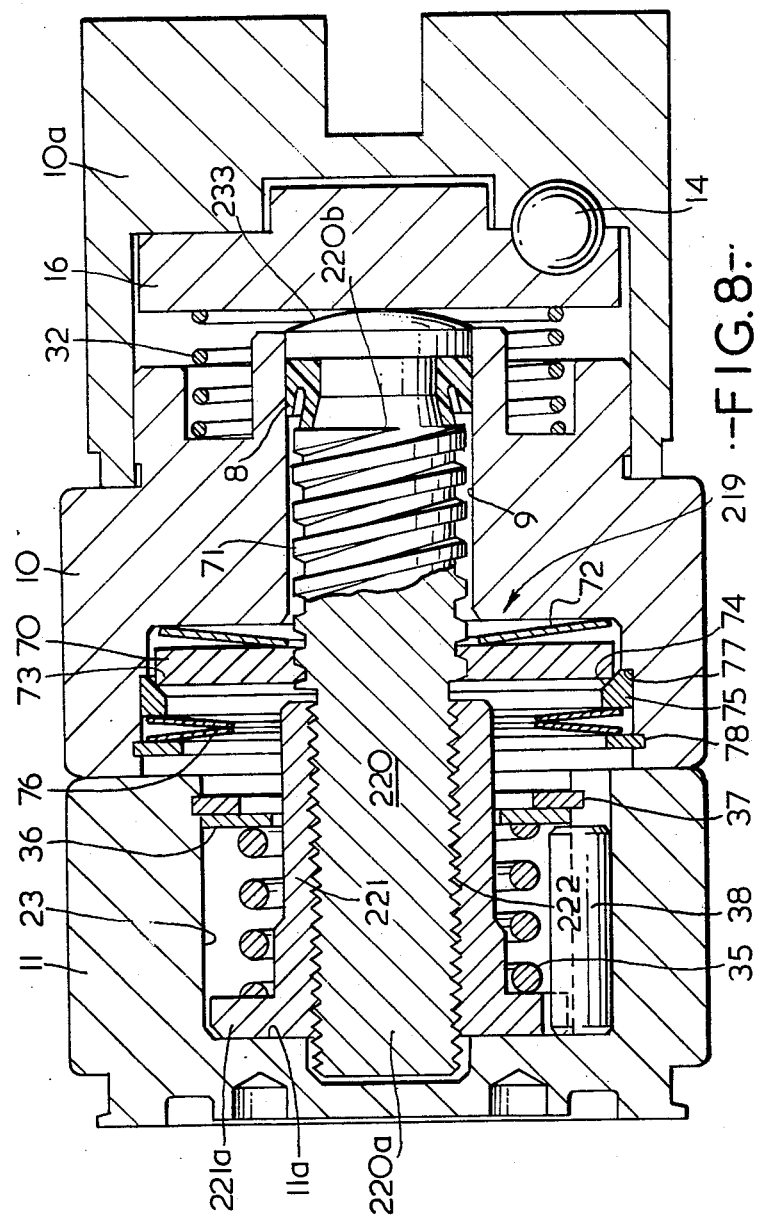

AUTOMATIC SLACK ADJUSTER FOR VEHICLE BRAKES COMBINED WITH A HYDRAULIC ACTUATOR AND AUXILIARY MECHANICAL ACTUATOR ASSEMBLY

The present invention relates to hydraulic actuators for vehicle brake systems, and more particularly to a hydraulic actuator comprising opposed relatively movable components and having an auxiliary mechanical actuator operable between the components via an automatic slack adjuster.

An automatic slack adjuster for a hydraulic actuator of the above kind, is described in British Pat. No. 1,284,273. Such automatic slack adjuster comprises rotatable and non-rotatable adjuster elements having a reversible screw-thread connection therebetween and is disposed between an auxiliary mechanical actuator fitted to a first hydraulic actuator component and a second hydraulic actuator component. The adjuster elements being urged in an axial direction relatively to one another responsively to excess travel between said hydraulic actuator components to cause the rotatable screw element to be screwed along the nonrotatable screw element and thereby reduce the brake slack. Friction surfaces are associated with said rotatable screw element and said second hydraulic actuator component so as to be urged into abutment with one another by the brake thrust to inhibit rotation of said rotatable screw element whereby said relative advance of said screw elements can only take place during take-up of slack, when the braking force is slight and the brake deflection is negligable. The automatic adjuster is thus 'load insenstive' in that it does not respond to additional actuator travel due to brake deflection.

In the preferred embodiments illustrated in the above patent the rotatable adjuster element comprises a nut associated with the second hydraulic actuator component and the non-rotatable adjuster element comprises a screw-threaded strut upon which the mechanical actuator acts via a plunger slidably sealed in the first hydraulic actuator component, the mechanical actuator being fitted to the first component of the hydraulic actuator. In one embodiment the nut forming the rotatable element is effectively part of the second component of the hydraulic actuator which acts on a non-rotatable member via the friction surfaces. A disadvantage of this arrangement is that the rotatable adjuster element is of relatively large diameter and exhibits a high resistance to rotation thereof. In another embodiment described in this prior patent this disadvantage is substantially avoided by making the rotatable nut separate from the second hydraulic actuator component, the friction surfaces being disposed between the rotatable nut and the second hydraulic actuator component. This arrangement has the disadvantage that an additional hydraulic seal has to be provided between the nut and the second actuator component.

According to one aspect of the present invention, a hydraulic actuator for a vehicle brake comprises opposed first and second non-rotatable but relatively axially displacement components which are movable apart by the application of hydraulic pressure therebetween and having a mechanical actuator fitted to said first component and an automatic slack adjuster operative between said auxiliary mechanical actuator and said second component, said slack adjuster including rotatable and non-rotatable adjuster elements of which the rotatable element has a screw-threaded portion in screw-threaded engagement with the said non-rotatable element and a further portion non-rotatable relative to its screw-threaded portion and slidably sealed to said first hydraulic actuator component, such that the hydraulic pressure acts on said further portion of said rotatable adjuster element in the same direction as it acts on said first hydraulic actuator component, said auxiliary mechanical actuator acting on said second hydraulic actuator component via said rotatable adjuster element, said screw-threaded engagement and said non-rotatable adjuster element in that order, spring means being arranged to bias said further portion of said rotatable adjuster element in a direction opposite to the direction in which the applied hydraulic pressure acts thereon for producing at least part of an adjustment cycle when lining wear has taken place and when the applied hydraulic pressure is below a predetermined relatively low value, said adjustment cycle consisting of or including rotation of said rotatable adjuster element in a direction to take up increased slack due to the lining wear, said spring means being overcome by the applied hydraulic pressure acting on said further portion of said rotatable adjuster element to inhibit any part of an adjustment cycle whenever the applied hydraulic pressure is above said predetermined relatively low value.

According to another aspect of the present invention, a hydraulic actuator for a vehicle brake comprises opposed first and second non-rotatable but relatively axially displaceable components which are movable apart by the application of hydraulic pressure therebetween and having a mechanical actuator fitted to said first component and an automatic slack adjuster operative between said auxiliary mechanical actuator and said second component, said slack adjuster including rotatable and non-rotatable adjuster elements of which the rotatable element has a screw-threaded portion having a reversible screw-thread connection with said non-rotatable element and a further portion non-rotatable relative to its screw-threaded portion and slidably sealed to said first hydraulic actuator component, such that the hydraulic pressure acts on said further portion of said rotatable adjuster element in the same direction as it acts on said first hydraulic actuator component, co-operating frictional abutment surfaces being provided on said further portion of said rotatable adjuster element and a further non-rotatable member, said auxiliary mechanical actuator acting on said second hydraulic actuator component via said further non-rotatable member, said frictional abutment surfaces, said rotatable adjuster element, said screw-thread connection and said non-rotatable adjuster element in that order, spring means being arranged to bias said further portion of said rotatable adjuster element in a direction to at least tend to part said frictional abutment surfaces to permit said reversible screw-thread connection to rotate said rotatable adjuster element when lining wear has taken place and when the applied hydraulic pressure is below a predetermined relatively low value, such rotation of the rotatable adjuster element being in a direction to take up increased slack due to the lining wear, said spring means being overcome by the applied hydraulic pressure acting on said further portion of said rotatable adjuster element to enable the applied hydraulic pressure to urge said frictional abutment surfaces against one another to inhibit rotation of said rotatable adjuster element whenever the applied hydraulic pressure is above said predetermined value.

Advantageously the frictional abutment surfaces are frusto-conical.

Preferably the first hydraulic actuator component has a bore therein and the rotatable adjuster element comprises a push-rod slidably received in said bore.

An additional relatively light spring can act upon said further portion of said rotatable adjuster element to assist the residual hydraulic pressure in acting on said further portion in overcoming the friction at the reversible screw-thread connection and at the hydraulic seal resisting rotation of the rotatable adjuster element.

A ratchet mechanism can be provided between the additional non-rotatable member and the rotatable adjuster element to prevent reverse rotation of the latter due to "knock back".

The invention, however, is not limited to a hydraulic actuator fitted with an automatic slack adjuster employing a reversible screw-thread connection between the rotatable and non-rotatable elements, as described in British Pat. No. 1,284,273, but is also applicable to hydraulic actuators fitted with automatic slack adjusters in which the screw-thread connection between the rotatable and non-rotatable adjuster elements is non-reversible and the slack adjuter includes an adjuster mechanism responsive to excess brake slack for rotating the rotatable adjuster element to take up the excess slack, as described in British Pat. No. 1,381,281.

Figure 4:
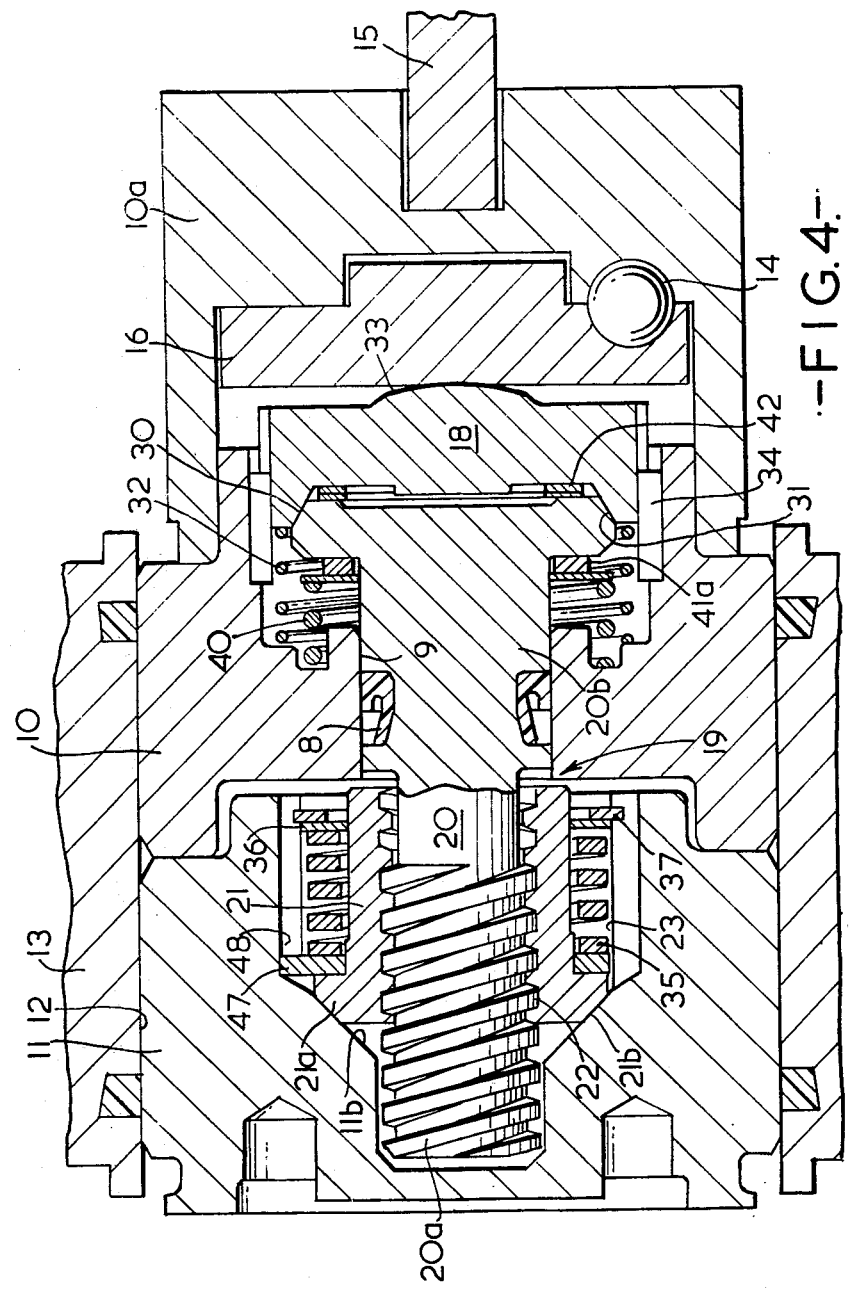

The arrangement shown in this British patent again has the disadvantage that an additional seal has had to be provided to render the adjuster load insensitive. On the other hand in FIG. 2 of British Pat. No. 1,179,235 there is illustrated a similar type of slack adjuster which is rendered substantially load-insensitive in that the hydraulic pressure loads the non-reversible screw-thread connection when the braking pressure becomes significant and inhibits adjustment responsive to brake deflection. A disadvantage of this embodiment is that relative sliding takes place between this nut and the seal by which it is sealed to the hydraulic actuator component to which the auxiliary mechanical actuator is fitted, even right up to the maximum braking pressure. This leads to a short seal life. In FIG. 4 of British Pat. No. 1169577 there is shown a load insensitive adjuster in which a non-rotating nut is slidably sealed to the piston to which the mechanical actuator is fitted such that at relatively high applied hydraulic pressures relative sliding at this seal is avoided. However, this adjuster has the disadvantages that this seal has has to accommodate the maximum actuator travel equivalent to two friction pad thicknesses, so that the seal will be effective with new pads and with worn pads, and that a low friction bearing has to be provided for the rotatable push rod, which is in screw-threaded connection with the nut and upon which the mechanical actuator acts.

According to a further aspect of the present invention, a hydraulic actuator for a vehicle brake comprises opposed first and second non-rotatable but relatively axially displaceable components which are movable apart by the application of hydraulic pressure therebetween and having a mechanical actuator fitted to said first component and an automatic slack adjuster operative between said mechanical actuator and said second component, said slack adjuster including rotatable and non-rotatable adjuster elements of which the rotatable element has a screw-threaded portion having a non-reversible screw-thread connection with said non-rotatable element and a further portion non-rotatable relative to its screw-threaded portion and slidably sealed to said first hydraulic actuator component, such that the hydraulic pressure acts on said further portion of said rotatable adjuster element in the same direction as it acts on said first hydraulic actuator component, said auxiliary mechanical actuator acting on said second hydraulic actuator component via said rotatable adjuster element, said screw-thread connection and said non-rotatable adjuster element in that order, said slack adjuster further including an adjuster mechanism responsive to relative axial travel between said further portion of said rotatable adjuster element and said first actuator component for turning said rotatable adjuster element to take up excessive slack due to lining wear, a cycling spring being arranged to bias said further portion of said rotatable adjuster element in a direction opposite to the direction in which the applied hydraulic pressure acts thereon for producing part of an adjustment cycle when lining wear has taken place and when the applied hydraulic pressure is below a predetermined relatively low value, said adjustment cycle comprising said turning of the rotatable adjuster element by said adjuster mechanism by relative axial displacement in one direction between said further portion of said rotatable adjuster element and said first hydraulic actuator component and setting of said adjuster mechanism by relative axial displacement in the opposite direction between said further portion of said rotatable adjuster element and said first hydraulic actuator component, said cycling spring being overcome by the applied hydraulic pressure acting on said further portion of said rotatable adjuster element to inhibit any relative axial movement between said further portion of said rotatable adjuster element and said first hydraulic actuator component whenever the applied hydraulic pressure is above said predetermined relatively low value.

Figure 2:
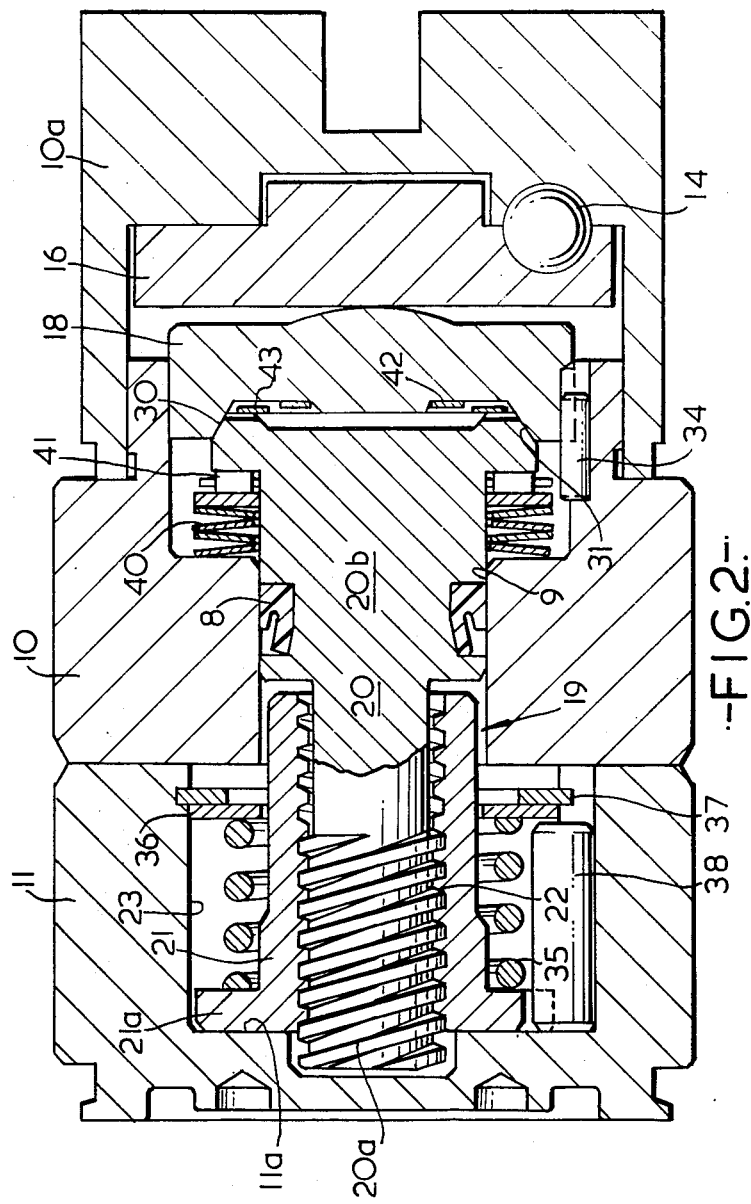
Figure 3:
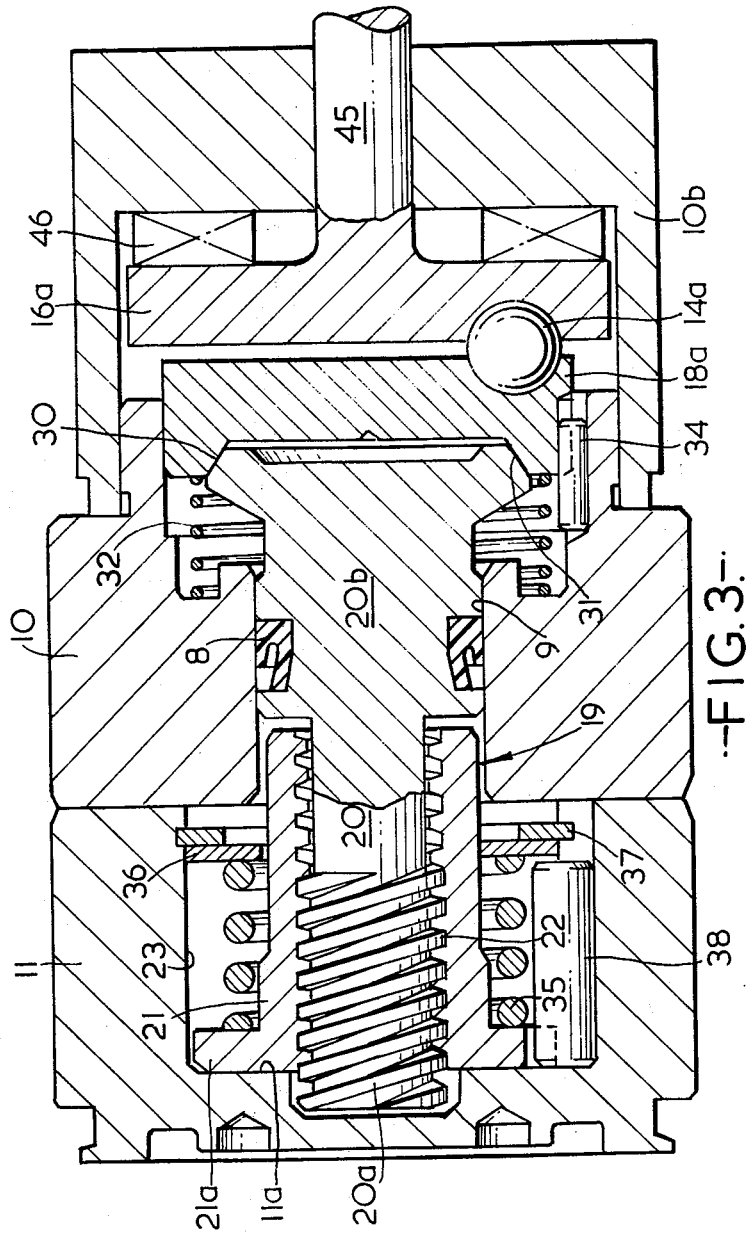

The invention is further described, by way of example, with reference to the accompanying drawings, in which:

FIG. 1 is a longitudinal sectional view of a first embodiment of brake actuator constructed in accordance with the invention with an automatic slack adjuster, FIGS. 2, 3 and 4 are similar views illustrating other embodiments of automatic slack adjuster and brake actuator, FIGS. 5 and 6 are detailed sectional views illustrating other embodiments of auxiliary mechanical actuator, FIG. 7 is a diagrammatic sectional view illustrating an alternative arrangement of the automatic slack adjuster, and FIG. 8 is a longitudinal sectional view of a brake actuator fitted with a further embodiment of automatic slack adjuster.

Referring to FIG. 1 of the drawings, a hydraulic actuator for a disc comprises opposed pistons 10 and 11 slidable in a through bore 12 in a body member 13.

The first piston 10 acts via an extension 10a upon a yoke 15 (only part of which is shown) slidably mounted on the body member 13 and acting upon another pad (also not shown) co-operable with one face of a disc (also not shown). The second piston 11 acts upon a directly operated pad (not shown) which co-operates with the other face of the disc. The disc brake may be constructed as described in British Patent No. 1,075,371.

An auxiliary mechanical actuator is fitted to the first piston 10 and comprises a face cam disc 16 journalled in this piston for rotation about the longitudinal axis of the actuator. Three balls 14 are disposed 120° apart in helically inclined grooves in the cam disc 16 and in the end wall of the piston extension 10a. The came disc 16 acts through a non-rotatable member 18 upon one end of an automatic adjuster 19 whose other end co-operates with the second piston 11. Reference may be made to British Patent Spec. No. 1,194,844 for a description of means for rotating the cam disc 16. The adjuster comprises a rotatable element 20 and a non-rotatable element 21 having a reversible screw-thread connection 22 therebetween. A reversible screw thread connection is a connection such that axial displacement to one element can cause rotation of the other element and vice-versa. This property is dependent upon the pitch angle, the flank angle and the coefficient of friction of the screw-thread connection. The rotatable adjuster element 20 is in the form of a push-rod having a screw-threaded portion 20a provided with an external screw-thread which mates with an internal screw-thread in the non-rotatable adjuster element 21 to form the screw-thread connection 22, the non-rotatable adjuster element being in the form of a nut. The push-rod 20 has a further portion 20b which is slidable in a bore 9 in the piston 10 and is sealed thereto by a sealing ring 8. The outer end of the rod portion 20b is in abutment withe the member 18 via frusto-conical friction surfaces 30 and 31. A spring 32 acts between the piston 10 and the member 18 and serves as a handbrake return spring, the member 18 having a centrally disposed sphericol formation 33 which engages the cam disc 16 to minimize frictional torque between these parts and to permit proper alignment of the member 18. The member 18 and the piston 10 are provided with part cylindrical grooves in which a dowel 34 is received to prevent the member 18 from rotating relative to the piston 10. The piston 10 is itself prevented from turning by the yoke 15.

The nut 21 is partially received in a blind bore 23 in the second piston 11 and is biassed against the end wall 11a of the bore 23 by a spring 35. The spring 35 lies between a flange 21a on the nut 21 and a disc 36 held in place by a spring ring 37 received in an annular groove in the piston bore 23. The flange 21a and the piston 11 are provided with part-cylindrical grooves in which an axially extending dowel 38 is received to prevent the nut 21 from turning relative to the piston 11. The piston 11 may itself be prevented from turning by a not illustrated pad assembly against which this piston acts.

To apply the brakes hydraulically, hydraulic fluid is supplied to the space between the pistons 10 and 11 to urge these pistons apart. The first piston 10 acts via the piston extension 10a and the yoke 15 on the indirectly operated pad assembly and the second piston 11 acts against the directly operated pad assembly. The normal brake slack is provided by axial clearance at the screw thread connection 22 and normally the piston 11 is not separated from the directly operated pad assembly. Once the pistons 10 and 11 are under hydraulic pressure, this pressure also acts on the further portion 20b of the push-rod 20 to urge the frusto-conical friction surfaces 30 and 31 into engagement with one another. This prevents the rod 20 from turning and when the axial clearance at the screw-thread connection 22 is taken up, e.g. upon brake deflection, the nut 21 moves with the rod 20, compressing the spring 35. When pad wear has taken place, the directly operated pad and the second piston 11 do not move back to quite the same position upon release of the brake so that a small gap remaining between the nut flange 21a and the piston end wall 11a so long as the hydraulic pressure is still at a relatively low predetermined value which is still sufficient to overcome the spring 35. As the hydraulic pressure falls further the spring 35 tends to separate the frusto-conical friction surfaces 30 and 31, thus allowing the reversible screw-thread connection 22 to turn the rod 20 subjected to the residual hydraulic pressure. Thus, adjustment can only take place while excessive running clearance is being taken up and the hydraulic pressure is relatively low. Over-adjustment is prevented from taking place upon brake distortion arising from heavy brake application, the additional piston travel being permitted by compression of the spring 35.

The brake is applied mechanically by rotating the cam disc 16. The thrust developed between the friciton surfaces 30 and 31 by the mechanical application of the brake prevents the push-rod 20 from turning.

The embodiment of FIG. 2 is in most respects similar to that of FIG. 1 and like parts are denoted by like reference numerals. The embodiment of FIG. 2 differs from that of FIG. 1 in two respects. Firstly, a spring 40 in the form of a stack of spring washers acts via an axial thrust bearing 41 on the further portion 20b of the push-rod 20. The force of the spring 40 supplements the relatively low hydraulic pressure acting on the push-rod portion 20b for the purpose of effecting adjustment, the force of the spring 40 being lower than the force of the spring 35. This is to overcome the possibility of the resistance to rotation of the push-rod 20 being too great to permit rotation at sufficiently low hydraulic pressures. Secondly, a ratchet member 42 is fixed to the member 18 and includes springly pawl 43 co-operating with ratchet teeth in the end face of the push-rod 20. The ratchet member 42 serves to prevent reverse rotation of the push rod 20. This is for the purpose of preventing reverse rotation under knock-back conditions.

The embodiment of FIG. 3 is again very similar to that of FIG. 1 and like parts are denoted by like reference numerals. In the embodiment of FIG. 3, the non-rotatable member 18a having the frusto-conical friction surface 31 serves simultaneously as a non-rotatable part of the mechanical actuator. In this embodiment the rotatable cam disc 16a is journalled by a shaft 45 in the piston extension 10b. Three balls 14a are disposed 120° apart in helically inclined grooves in the cam disc 16a and in the non-rotatable member 18a. A thrust bearing 46 is fitted between the cam disc 16a and the end wall of the piston extension 10b. In this embodiment an alternative arrangement has to be provided to enable the piston extension 10b to abut the yoke (not illustrated).

With the use of automatic adjusters provision has to be made to accommodate very substantial travel between the pistons 10 and 11 which might take place if, for example, new pads are replaced by worn pads or the adjuster is wound back during servicing and worn pads are refitted. With the adjuster of FIG. 1 there is a hydraulic pressure below which the push rod 20 will not rotate due to seal friction and thread friction, but at which the pistons 10 and 11 can separate. When an excessively large brake slack is present and sufficient hydraulic fluid can be delivered to apply the brake, e.g. in a power braking system the travel between the pistons 10 and 11 might be so great as to bring the right hand head end of the push rod 20 into engagement with the back face of the piston 10 and then completely collapse the spring 35. To permit the push rod 20 to rotate under these conditions and thereby prevent damage to the adjuster, a low friction bearing 44, e.g. of P.T.F.E. polytetrafluorethylene, is provided on the rear face of the piston 10. A similar modification can be made to the embodiment of FIG. 3.

The embodiment of FIG. 4 incorporates features of the embodiments of FIGS. 1 and 2 and again like parts are denoted by like reference numerals. In FIG. 4, the end wall of the piston 11 is provided with a frusto-conical abutment surface 11b against which a part-spherical surface 21b on the flange 21a of the nut 21 is urged by the spring 35. This enables the nut 21 to be self-aligning. The roller thrust bearing 41 of FIG. 2 is replaced in the FIG. 4 embodiment by an anti-friction washer 41a of low friction material such as P.T.F.E. The dowel 38 of FIGS. 1 and 2 is replaced in the embodiment of FIG. 4 by a washer 47 which is force-fitted on the nut 21 against its flange 21a and has a projection received in an axial groove 48 formed in the inner peripheral wall of the piston 11 to prevent the nut 21 from rotating.

The mechanism comprising the nut 21 and the spring 35 can be encapsulated, i.e. disposed in a container capsule in which is provided the abutment surface 11a or 11b and in an open end of which the spring ring 37 is secured, keying means, such as the washer 47, being provided to prevent the nut 21 from rotating in the capsule. The spring 35 is thus pre-compressed before fitting to the actuator, thereby facilitating assembly, the container capsule being fixed to the respective piston, e.g. by force-fitting.

FIG. 5 illustrates another embodiment of auxiliary mechanical actuator. This comprises a cam member 16b journalled in a hydraulic actuator component 10b which in this embodiment is a cylinder body in whose cylinder bore 12A the piston 11 is slidably sealed. The cam member 16b has a helical surface 50 complementary to a helical surface 51 provided on the further non-rotatable member 18b. Rollers 14b, located by means of a cage 52, are disposed between the helical surfaces 50 and 51. An axial thrust bearing 53, preferably also comprising caged rollers, is arranged between the rotatable cam member 16b and the cylinder body 10b. Thus, rotation of the cam member 16b by a lever 54 in an appropriate direction urges the non-rotatable member 18b to the left against the push-rod 20.

Fitted in the cylinder body 10b is an additional part 55, secured in place by means of a screw 57. The non-rotatable member 18b is keyed to the part 55 to prevent rotation of the member 18b whilst permitting its axial displacement. The seal 8 sealing the further portion 20b of the push-rod 20 co-operates with a bore 9 formed in the part 55. The automatic slack adjuster of FIG. 5 operates in the same way as that of FIG. 1. Reference may be made to U.S.A. Pat. No. 3,952,844 to Newstead and Warnock for a fuller description of the mechanical actuator of FIG. 5.

FIG. 6 of the drawings illustrates diagrammatically a detail of an embodiment in which the auxiliary mechanical actuator comprises a cam 16c which is journalled in the piston portion 10a about an axis perpendicular to the axis of the hydraulic actuator. The cam 16c acts on the further non-rotatable member 18c via a dolly 60. The member 18c is keyed to the piston extension 10a and has the frictional abutment 31 which co-operates with the frictional abutment surface 30 on the further portion 20b of the rotatable adjuster element. Rotation of the cam 16c in an anti-clockwise direction in FIG. 6 urges the further non-rotatable member 18c to the left.

In all of the embodiments of the invention described and illustrated so far the rotatable adjuster element 20 comprises a screw-threaded portion 20a and a further portion 20b slidably sealed to a hydraulic actuator component, which portions are integrally formed as a strut or push-rod, and the non-rotatable adjuster element 21 is in the form of a nut separate from the piston 11, the spring 35 being operative between the nut 21 and the piston 11. FIG. 7 of the drawings illustrates diagrammatically that an alternative arrangement is possible wherein the non-rotatable adjuster element 121 is integral with or fixed relatively to the second piston 111 and the rotatable adjustor element 120 is formed of two separate portions 120a and 120b with spring 35a acting therebetween. The portion 120a has the reversible screw-thread connection 22a with the non-rotatable element 121 effectively part of the piston 111 and the portion 120b is slidably sealed by the seal 8 to the bore 9 in the first piston 10. The rotatable adjuster element 120a and 120b are made relatively axially displaceable by means of a lost motion connection but relatively non-rotatable by means of a suitable key arrangement. The spring 35a biases the portions 120a and 120b axially towards one another. The operation of the automatic adjuster shown in FIG. 7 is effectively the same as that of FIGS. 1 to 4.

In the embodiments of the invention illustrated in FIGS. 1 to 7 of the drawings, the screw-thread connection 22 is a reversible screw-thread connection and adjustment is effected when required by the spring 35 acting to the left on the nut 21 and the residual hydraulic pressure (supplemented by the spring 40 in FIGS. 2 and 4) acting to the right on the further portion 20b of the push-rod 20 thus causing the screw-thread connection 22 to turn the push-rod 20. The spring 35 tends to separate the frictional abutment surfaces 30 and 31 thus relieving these frictional surfaces of frictional torque and allowing the push-rod 20 to rotate. The push-rod 20 does not actually move to the left, or at least does not move significantly, relative to the piston 10 but it will be seen that the adjustment is responsive to the tendency for the push-rod portion 20b to move to the left relative to the piston 10 because this relieves the frictional abutment surfaces 30 and 31 of axial load, thereby relieving the frictional torque. In other words the auxiliary mechanical actuator is disposed in the hydraulic actuator component (the piston 10) relative to which there is at least a tendency for the push-rod portion 20b to be displaced when adjustment is required to take up slack but only when the hydraulic pressure is below the relatively low predetermined value at which the spring 35 is stronger than the force applied to the push-rod 20 by the hydraulic pressure.

This same principle is applied to the embodiment of the invention shown in FIG. 8 of the drawings in which parts like those of FIGS. 1 to 4 are denoted by like reference numerals, but in this embodiment there is a non-reversible screw-thread connection 222 between a screw-threaded portion 220a of a push-rod 220 and a nut 221 biased by the spring 35 against the base 11a of the piston 11. An adjuster mechanism 219 is provided for turning the push-rod 220 when adjustment is required. This adjuster mechanism 219 is responsive to actual movement of a further portion 220b of the push-rod 220 to the left relative to the piston 10 when adjustment is required, the piston 10 being the hydraulic actuator component to which the auxiliary mechanical actuator 16 is fitted.

The further portion 220b of the push rod 220 is sealed by the sealing ring 8 to the through bore 9 in the piston 10. The rotatable cam disc 16 journalled in the piston extension 10a acts on a domed end 233 of the push-rod portion 220b.

The adjuster mechanism 219 includes a third adjuster element in the form of a drive ring 70 which has a reversible screw-thread connection 71 with the push-rod portion 220b. A spring washer 72 biases a friction surface 73 formed by one corner of the drive ring 70 against a frusto-conical friction surface 74 on a separate annular part 75 which, so far as automatic adjustment is concerned, can be regarded as part of the piston 10. The separate part 75 is actually biassed by further spring washers 76 against a shoulder 77 in the piston 10, the spring washers 76 being retained by a spring ring 78. The spring washers 76 are stronger than the spring washer 72 and their purpose is to yield to allow the drive ring 70 to move to the left relative to the piston 10 when the auxiliary mechanical actuator is applied, thereby preventing damage to the adjuster mechanism.

The spring 35 is a cycling spring for the adjuster mechanism 219. An adjustment cycle comprises two parts, of which one part is rotation of the push-rod 220 by the reversible screw-thread connection 71 with the drive ring 70 held fast by the friction surfaces 73, 74 and the other part is setting of the adjuster mechanism 219 by rotation of the drive ring 70 by the screw-thread connection 71 when there is a tendency for the friction surfaces 73, 74 to be parted. These two parts of an adjustment cycle take place due to leftward and rightward movement of the push-rod 220 relative to the piston 10 by a sufficient amount to take up axial clearance provided at the reversible screw-thread connection 71.

If now it is supposed that, with the brakes applied, some lining wear takes place and, on brake release, the pistons 10 and 11 do not move back quite so close to one another. Thus, as the applied pressure falls below the relatively low predetermined value, the cycling spring 35 pulls the nut 221 against the base 11a of the piston 11 and takes up any axial clearance at the non-reversible screw-thread connection 222 and pulls the push-rod portion 220b away from the cam disc 16 to more than take up the axial clearance at the reversible screw-thread connection 71. The drive ring 70 is prevented from rotating by the friction surfaces 73 and 74 and the reversible screw-thread connection 71 rotates the push-rod 220 in a direction to take up some of the excessive brake slack due to the lining wear, the screw-thread connections 71 and 222 being of opposite hand. The next time the brake is applied, the cycling spring 35 again carries the nut 221 and the push-rod 220 with the piston 11 until the hydraulic pressure rises above the predetermined value at which the force of the pressure acting on the push-rod portion 220b overcomes the spring 35. The domed end 233 of the push-rod portion 220b is then pushed by the hydraulic pressure into engagement with the cam disc 16, thereby tending to move the drive ring 70 to the right against the spring 72. This relieves the friction surfaces 73 and 74 of the force of the spring 72, thereby allowing the reversible screw-thread connection 71 to turn the drive ring 70 to a new position at which it is set and ready to effect another adjustment cycle when required. It will be seen that the spring washer 72 engages the drive ring 70 towards its inner diameter, thereby minimizing the frictional torque applied to the drive ring by the spring washer.

Reference may be made to British Pat. No. 1,381,281 for further description of the mode of operation of the adjuster mechanism 219 shown in FIG. 8 of the drawings.

Various modifications to the embodiment of FIG. 8 are possible. For example, the reversible screw-thread connection 71 can be arranged between the drive ring 70 and the first piston 10 and the friction surfaces 73 nd 74 can be arranged between the drive ring 70 and the push-rod portion 220b.

A one-way clutch, e.g. a ratchet like the ratchet member 42 of FIGS. 2 and 4, can be provided for preventing reverse rotation of the rotatable adjuster element 220 through knock-back.

The adjuster mechanism 219 shown in FIG. 8 of the drawings is of a kind in which a reversible screw-thread connection is used to effect adjustment at a non-reversible screw-thread connection. A number of such adjusters are described and illustrated in British Pat. No. 1,179,235 and it will be apparent from that patent that the adjuster mechanism 219 can be replaced by a cam operated adjuster mechanism. In this case, the drive ring 70 would be replaced by a face cam disc which cooperates with a collar formed on the push-rod portion 220b, balls or other rolling members being disposed in inclined grooves in the mutually facing faces of the face cam disc and the collar and a torsion spring being operative between the face cam disc and the rotatable adjuster element 220. The mode of operation of such an adjuster will be apparent from British Pat. No. 1,179,235.

It is possible to modify the embodiment of FIG. 8 of the drawings by making the nut 221 fixed to or integral with the piston 11 and by making the push-rod portions 220a and 220b relatively axially displaceable through a lost motion connection but non-relatively rotatable and by disposing the spring 35 between the push-rod portions in the manner illustrated in FIG. 7.

Whereas the adjusters shown in FIGS. 1 to 7 of the drawings are of the so-called "one-shot" type, i.e. the whole of the excess brake slack due to lining wear is taken up immediately by a single adjustment operation, the adjuster shown in FIG. 8 is of the so-called "incremental" type. In other words, the adjustment effected by the turning of the push-rod 220 during a single adjustment cycle is insufficient to take up all of the excess brake slack giving rise to the adjustment. Further adjustment cycles of decreasing magnitude take place successively on subsequent brake application and release operations.

In all embodiments of the invention, whilst the applied hydraulic pressure remains above the relatively low predetermined value required to overcome the spring 35, the further push-rod portion is caused to follow the movement of the piston 10 by remaining directly in abutment with the mechanical actuator in FIG. 8 or indirectly in abutment with the mechanical actuator via the further non-rotatable member 18 in FIGS. 1 to 7. There is no sliding of the seal in the bore 9 whenever the hydraulic pressure is of appreciable magnitude and this leads to a maximum life for the seal 8. The hydraulic pressure acting on the push-rod portion 20b causes or tends to cause the latter to follow the first piston 10 during an adjustment cycle, so avoiding the need to provide a low friction thrust bearing between these two parts. The frictional torque at the seal 8, resisting rotation is not high since the hydraulic pressure being sealed is relatively low during an adjustment cycle.

Thus it will be seen that there has been provided a hydraulic actuator fitted with an auxiliary mechanical actuator and an automatic adjuster which is rendered load-insensitive without requiring the provision of any additional seals. This is because the adjustment is responsive to a tendency for movement (FIGS. 1 to 7) or actual movement (FIG. 8) of at least a portion of the rotatable adjuster element relative to that component of the hydraulic actuator to which the auxiliary mechanical actuator is fitted.

FIGS. 1 to 4 and 8 illustrate the invention as applied to a hydraulic actuator which comprises opposed pistons slidable in a through bore. FIG. 5 of the drawings illustrates diagrammatically that the invention is equally applicable to a hydraulic actuator comprising a piston slidable in a blind bore in a cylinder body. In such a case, the piston and the cylinder body constitute the two relatively movable active components of the hydraulic actuator, and in this case the mechanical actuator, i.e. the cam, can be fitted either to the piston or to the cylinder body. In the former case, the push-rod 20 and the nut 21 are arranged between the cam and the cylinder body and in the latter case, as shown in FIG. 5, they are arranged between the cam and the piston. Hydraulic actuators comprising a piston slidable in a cylinder body are used in so-called reaction type disc brakes in which, for example, the cylinder body forms a part of the brake caliper.

I Claim:

1. In combination with a hydraulic actuator for a vehicle brake comprising opposed first and second non-rotatable but relatively axially displaceable components which are movable apart by the application of hydraulic pressure therebetween; an auxiliary mechanical actuator fitted to said first component; an automatic slack adjuster operative between said auxiliary mechanical actuator and said second component for taking up increased slack due to lining wear, said slack adjuster including rotatable and non-rotatable adjuster elements of which the rotatable element has a screw-threaded portion and a further portion non-rotatable relatively thereto and a screw-thread connection between said screw-threaded portion and said non-rotatable adjuster element; means slidably sealing said further portion to said first hydraulic actuator component, such that the hydraulic pressure acts on said further portion of said rotatable adjuster element in the same direction as it acts on said first hydraulic actuator component, said auxiliary mechanical actuator acting on said second hydraulic actuator component via said rotatable adjuster element, said screw-threaded engagement and said non-rotatable adjuster element in that order; and spring means arranged to bias said further portion of said rotatable adjuster element in a direction opposite to the direction in which the applied hydraulic pressure acts thereon for producing at least part of an adjustment cycle when lining wear has taken place and when the applied hydraulic pressure is below a predetermined relatively low value, said adjustment cycle at least in part consisting of rotation of said rotatable adjuster element in a direction to take up increased slack due to the lining wear, said spring means being overcome by the applied hydraulic pressure acting on said further portion of said rotatable adjuster element to inhibit any part of an adjustment cycle whenever the applied hydraulic pressure is above said predetermined relatively low value.

2. A hydraulic actuator according to claim 1 in which said screw-threaded and further portions of said rotatable adjuster element are integral with or fixed to one another and said spring means is disposed between said non-rotatable adjuster element and said second hydraulic actuator component.

3. A hydraulic actuator according to claim 1 in which said non-rotatable adjuster element is integral with or fixed to said second hydraulic actuator component and said spring means is disposed between said screw-threaded and further portions of said rotatable adjuster element.

4. In combination with a hydraulic actuator for a vehicle brake comprising opposed first and second non-rotatable but relatively axially displaceable components which are movable apart by the application of hydraulic pressure therebetween; an auxiliary mechanical actuator fitted to said first component; an automatic slack adjuster operative between said auxiliary mechanical actuator and said second component, said slack adjuster including rotatable and non-rotatable adjuster elements of which the rotatable element has a screw-threaded portion and a further portion non-rotatable relatively thereto and a reversible screw-thread connection between said screw-threaded portion and said non-rotatable adjuster element; means slidably sealing said further portion of said first hydraulic actuator component, such that the hydraulic pressure acts on said further portion of said rotatable adjuster element in the same direction as it acts on said first hydraulic actuator component; a further non-rotatable member; co-operating frictional abutment surfaces on said further portion of said rotatable adjuster element and said further non-rotatable member, said auxiliary mechanical actuator acting on said second hydraulic actuator component via said further non-rotatable member adjuster element, said screw-thread connection and said non-rotatable adjuster element in that order; and spring means arranged to bias said further portion of said rotatable adjuster element in a direction to at least tend to part said frictional abutment surfaces to permit said reversible screw-thread connection to rotate said rotatable adjuster element when lining wear has taken place and when the applied hydraulic pressure is below a predetermined relatively low value, such rotation of the rotatable adjuster element being in a direction to take up increased slack due to the lining wear, said spring means being overcome by the applied hydraulic pressure acting on said further portion of said rotatable adjuster element to enable the applied hydraulic pressure to urge said frictional abutment surfaces against one another to inhibit rotation of said rotatable adjuster element whenever the applied hydraulic pressure is above said predetermined value.

5. A hydraulic actuator according to claim 4 in which said frictional abutment surfaces are frusto-conical.

6. A hydraulic actuator according to claim 4 in which said first actuator component has a bore therein and at least said further portion of said rotatable adjuster element comprises a push-rod slidably received in said bore and sealed thereto by said sealing means.

7. A hydraulic actuator according to claim 4 in which said reversible screw-thread connection comprises an external screw-thread on said threaded portion of said rotatable adjuster element and an internal screw-thread in said non-rotatable adjuster element.

8. A hydraulic actuator according to claim 4 which includes further spring means acting between said first hyraulic actuator component and said further non-rotatable member in a direction to urge the latter towards said auxiliary mechanical actuator.

9. A hydraulic actuator according to claim 4 which includes another spring means, weaker than the first-mentioned spring means, acting between said first hydraulic actuator component and said further portion of said rotatable adjuster element to assist the relatively low hydraulic pressure to overcome friction at said reversible screw-thread connection when adjustment is taking place.

10. A hydraulic actuator according to claim 4 further comprising a ratchet mechanism between said further non-rotatable member and said rotatable adjuster element to prevent reverse rotation of the latter due to "knock back".

11. A hydraulic actuator according to claim 4 in which said auxiliary mechanical actuator comprises a cam journalled in said first hydraulic actuator component.

12. A hydraulic actuator according to claim 11 in which said cam is journalled about the longitudinal axis of the hydraulic actuator.

13. A hydraulic actuator according to claim 12 in which said cam comprises an axially displaceable face cam disc having helically inclined grooves therein, said first hydraulic actuator component having complementary inclined grooves therein, and rolling members disposed between respective ones of said inclined grooves in said cam disc and in said first hydraulic actuator component.

14. A hydraulic actuator according to claim 12 in which said cam comprises a face cam disc having helically inclined grooves therein, said further non-rotatable member having complementary inclined grooves therein, and rolling members disposed between respective ones of inclined grooves in said cam disc and in said further non-rotatable member.

15. A hydraulic actuator according to claim 12 in which said cam comprises a rotatable member having a helical cam surface and a plurality of rolling members disposed between said helical cam surface and a complementary helical surface.

16. A hydraulic actuator according to claim 15 in which said complementary helical surface is on said further non-rotatable member.

17. A hydraulic actuator according to claim 11 in which said cam is journalled about an axis perpendicular to the longitudinal axis of the hydraulic actuator.

18. A hydraulic actuator according to claim 4 in which said screw-threaded and further portions of said rotatable adjuster element are integral with or fixed to one another and said spring means is disposed between said non-rotatable adjuster element and said second hydraulic actuator component.

19. A hydraulic actuator according to claim 4 in which said non-rotatable adjuster element is integral with or fixed to said second hydraulic actuator component and said spring means is disposed between said screw-threaded and further portions of said rotatable adjuster element.

20. In combination with a hydraulic actuator for a vehicle brake comprising opposed first and second non-rotatable but relatively axially displaceable components which are movable apart by the application of hydraulic pressure therebetween: an auxiliary mechanical actuator fitted to said first component; an automatic slack adjuster operative between said auxiliary mechanical actuator and said second component for taking up increased slack due to lining wear, said slack adjuster including rotatable and non-rotatable adjuster elements of which the rotatable element has a screw-threaded portion and a further portion non-rotatable relatively thereto and a non-reversible screw-thread connection between said screw-threaded portion and said non-rotatable adjuster element; means slidably sealing said further portion to said first hydraulic actuator component, such that the hydraulic pressure acts on said further portion of said rotatable adjuster element in the same direction as it acts on said first hydraulic actuator component, said auxiliary mechanical actuator acting on said second hydraulic actuator component via said rotatable adjuster element, said screw-threaded connection and said non-rotatable adjuster element in that order, said slack adjuster further including an adjuster mechanism responsive to relative axial travel between said further portion of said rotatable adjuster element and said first actuator component for turning said rotatable adjuster element to take up increased slack due to lining wear; and a cycling spring arranged to bias said further portion of said rotatable adjuster element in a direction opposite to the direction in which the applied hydraulic pressure acts thereon for producing part of an adjustment cycle when lining wear has taken place and when the applied hydraulic pressure is below a predetermined relatively low value, said adjustment cycle comprising said turning of the rotatable adjuster element by said adjuster mechanism by relative axial displacement in one direction between said further portion of said rotatable adjuster element and said first hydraulic actuator component and setting of said adjuster mechanism by relative axial displacement in the opposite direction between said further portion of said rotatable adjuster element and said first hydraulic actuator component, said cycling spring being overcome by the applied hydraulic pressure acting on said further portion of said rotatable adjuster element to inhibit any relative axial movement between said further portion of said rotatable adjuster element and said first hydraulic actuator component, thereby inhibiting any part of an adjustment cycle, whenever the applied hydraulic pressure is above said predetermined relatively low value.

21. A hydraulic actuator according to claim 20 in which said adjuster mechanism comprises a third adjuster element, a reversible screw-thread connection between said third adjuster element and said further portion of said rotatable adjuster element, co-operating friction surfaces effective between said third adjuster element and said first hydraulic actuator component and additional spring means acting on said third adjuster element to bias said frictional surfaces into engagement with one another.

22. A hydraulic actuator according to claim 21 further comprising a separate part having thereon the frictional surface appertaining to said first actuator component and further spring means biassing said separate part against an abutment shoulder provided in the first hydraulic actuator component, said further spring means being stronger than said additional spring means acting on said third adjuster element.

23. A hydraulic actuator according to claim 21 in which said third adjuster element is annular and said reversible screw-thread connection comprises an external screw-thread on said further portion of said rotatable adjuster element and an internal screw-thread in said third adjuster element.

24. A hydraulic actuator according to claim 21 in which said non-reversible screw-thread comprises an external screw-thread on said screw-threaded portion of said rotatable adjuster element and an internal screw-thread in said non-rotatable adjuster element.

25. A hydraulic actuator according to claim 20 in which said auxiliary mechanical actuator comprises a cam journalled in said first hydraulic actuator component.

26. A hydraulic actuator as claimed in claim 25 in which said cam is journalled about the longitudinal axis of the hydraulic actuator.

27. A hydraulic actuator as claimed in claim 26 in which said cam comprises an axially displaceable face cam disc having helically inclined grooves therein, said further non-rotatable member having complementary inclined grooves therein, and rolling members disposed between respective ones of said inclined grooves in said cam disc and in said first hydraulic actuator component.

28. A hydraulic actuator according to claim 20 in which said screw-threaded and further portions of said rotatable adjuster element are integral with or fixed to one another and said spring means is disposed between said non-rotatable adjuster element and said second hydraulic actuator component.

29. A hydraulic actuator according to claim 20 in which said non-rotatable adjuster element is integral with or fixed to said second hydraulic actuator component and said spring means is disposed between said screw-threaded and further portions of said rotatable adjuster element.

30. In combination with a hydraulic actuator for a vehicle brake comprising opposed first and second non-rotatable but relatively axially displaceable components which are movable apart by the application of hydraulic pressure therebetween; an auxiliary mechanical actuator comprising a cam journalled in said first component about the longitudinal axis of the hydraulic actuator; an automatic slack adjuster operative between said auxiliary mechanical actuator and said second component, said slack adjuster including rotatable and non-rotatable adjuster elements of which the rotatable element has a screw-threaded portion with an external screw-thread thereon and a further portion integral therewith and said non-rotatable adjuster element has an internal screw-thread mating with said external screw-thread to form a reversible screw-thread connection, said first actuator component having a bore therein and at least said further portion of said rotatable adjuster element comprising a push-rod slidably received in said bore; means slidably sealing said push-rod to said bore, such that the hydraulic pressure acts on said further portion of said rotatable adjuster element in the same direction as it acts on said first hydraulic actuator component, a further non-rotatable member; co-operating frusto-conical frictional abutment surfaces on said further portion of said rotatable adjuster element and said further non-rotatable member, said auxiliary mechanical actuator acting on said second hydraulic actuator component via said further non-rotatable member, said frictional abutment surfaces, said rotatable adjuster element, said screw-thread connection and said non-rotatable adjuster element in that order; and spring means disposed between said non-rotatable adjuster element and said second hydraulic actuator component to bias said rotatable adjuster element in a direction to at least tend to part said frictional abutment surfaced to permit said reversible screw-thread connection to rotate said rotatable adjuster element when lining wear has taken place and when the applied hydraulic pressure is below a predetermined relatively low value, such rotation of the rotatable adjuster element being in a direction to take up increased slack due to the lining wear, said spring means being overcome by the applied hydraulic pressure acting on said further portion of said rotatable adjuster element to enable the applied hydraulic pressure to urge said frictional abutment surfaces against one another to inhibit rotation of said rotatable adjuster element whenever the applied hydraulic pressure is above said predetermined value.

* * * * *